US009522451B2

(12) United States Patent
Nishida et al.

(10) Patent No.: US 9,522,451 B2
(45) Date of Patent: Dec. 20, 2016

(54) VERTICAL MACHINING CENTER

(71) Applicant: Yamazaki Mazak Corporation, Niwa-gun (JP)

(72) Inventors: Kiyoshi Nishida, Niwa-gun (JP); Satoi Usuda, Niwa-gun (JP); Satoshi Yoshinobu, Niwa-gun (JP); Masaya Satou, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 59 days.

(21) Appl. No.: 14/733,966

(22) Filed: Jun. 9, 2015

(65) Prior Publication Data

US 2015/0266148 A1 Sep. 24, 2015

Related U.S. Application Data

(63) Continuation of application No. PCT/JP2013/060315, filed on Apr. 4, 2013.

(51) Int. Cl.
*B23Q 3/157* (2006.01)
*B23C 9/00* (2006.01)
(Continued)

(52) U.S. Cl.
CPC ............. *B23Q 3/1578* (2013.01); *B23C 9/005* (2013.01); *B23Q 3/1574* (2013.01);
(Continued)

(58) Field of Classification Search
CPC ..................... Y10T 483/1738; Y10T 483/1743; Y10T 409/309296; Y10T 409/30448; Y10T 409/308456; B23Q 3/1578; B23Q 2220/008; B23Q 37/002; B23C 9/005; B23B 2229/16
(Continued)

(56) References Cited

U.S. PATENT DOCUMENTS 3,757,637 A * 9/1973 Eich ....................... B23B 31/266
409/230
3,930,301 A * 1/1976 Wagner .................... B23Q 3/12
483/32
(Continued)

FOREIGN PATENT DOCUMENTS

JP 58-117326 U 8/1983
JP 60-74924 U 5/1985
(Continued)

OTHER PUBLICATIONS

Machine Translation JP 06-023642-A, which JP '642 was published Feb. 1994.*
(Continued)

*Primary Examiner* — Erica E Cadugan
(74) *Attorney, Agent, or Firm* — Mori & Ward, LLP

(57) ABSTRACT

A vertical machining center includes a table, a tool spindle, an angle tool holder, a tool unclamping operation device, and a tool changer. The angle tool holder includes a shank, a spindle, a housing, a collet, a draw bar, and a spring mechanism. The shank has a shank axis and is rotatable around the shank axis. The spindle has a spindle axis perpendicular to the shank axis and is rotatable around the spindle axis. The tool unclamping operation device includes an angle tool holder rest, a hydraulic piston, and a restrictor. The angle tool holder is to be placed on the angle tool holder rest. The restrictor is disposed on the angle tool holder rest to restrict a portion of the angle tool holder and to receive force in a direction of the spindle axis which is generated in a case where the hydraulic piston presses the draw bar.

15 Claims, 16 Drawing Sheets

(51) Int. Cl.
  *B23Q 17/00* (2006.01)
  *B23B 31/26* (2006.01)
  *B23Q 5/04* (2006.01)
  *B23Q 37/00* (2006.01)

(52) U.S. Cl.
  CPC ......... *B23Q 3/15706* (2013.01); *B23Q 5/045* (2013.01); *B23Q 37/002* (2013.01); *B23B 31/265* (2013.01); *B23Q 3/15766* (2013.01); *B23Q 17/005* (2013.01); *B23Q 17/006* (2013.01); *B23Q 2220/008* (2013.01); *Y10T 409/308456* (2015.01); *Y10T 409/309296* (2015.01); *Y10T 409/309464* (2015.01); *Y10T 483/136* (2015.01); *Y10T 483/1738* (2015.01); *Y10T 483/1743* (2015.01); *Y10T 483/1845* (2015.01); *Y10T 483/1882* (2015.01)

(58) Field of Classification Search
  USPC ............... 483/32, 34; 409/230, 144, 215
  See application file for complete search history.

(56) References Cited

U.S. PATENT DOCUMENTS

| | | | | |
|---|---|---|---|---|
| 4,709,465 A | * | 12/1987 | Lewis | B23Q 1/0009 483/32 |
| 5,118,229 A | | 6/1992 | Lyons et al. | |
| 5,697,739 A | * | 12/1997 | Lewis | B23Q 5/045 409/230 |
| 5,823,722 A | * | 10/1998 | Takenaka | B23Q 3/1578 409/230 |
| 6,450,074 B1 | * | 9/2002 | Yong-Chang | B23Q 1/0072 409/230 |
| 2011/0182686 A1 | | 7/2011 | Usuda et al. | |
| 2011/0268520 A1 | | 11/2011 | Usuda et al. | |

FOREIGN PATENT DOCUMENTS

| | | | |
|---|---|---|---|
| JP | 63-288640 A | * | 11/1988 |
| JP | 02-063944 U | * | 5/1990 |
| JP | 03-26412 U | | 3/1991 |
| JP | 06-023642 A | * | 2/1994 |
| JP | 06-504731 | | 6/1994 |
| JP | 2002-154026 A | * | 5/2002 |
| JP | 4542626 B1 | | 9/2010 |
| JP | 4565199 B1 | | 10/2010 |
| JP | 2014-113653 A | * | 6/2014 |
| WO | WO 2011/030432 | | 3/2011 |
| WO | WO 2011/039886 | | 4/2011 |

OTHER PUBLICATIONS

International Search Report for corresponding International Application No. PCT/JP2013/060315, May 14, 2013.

* cited by examiner

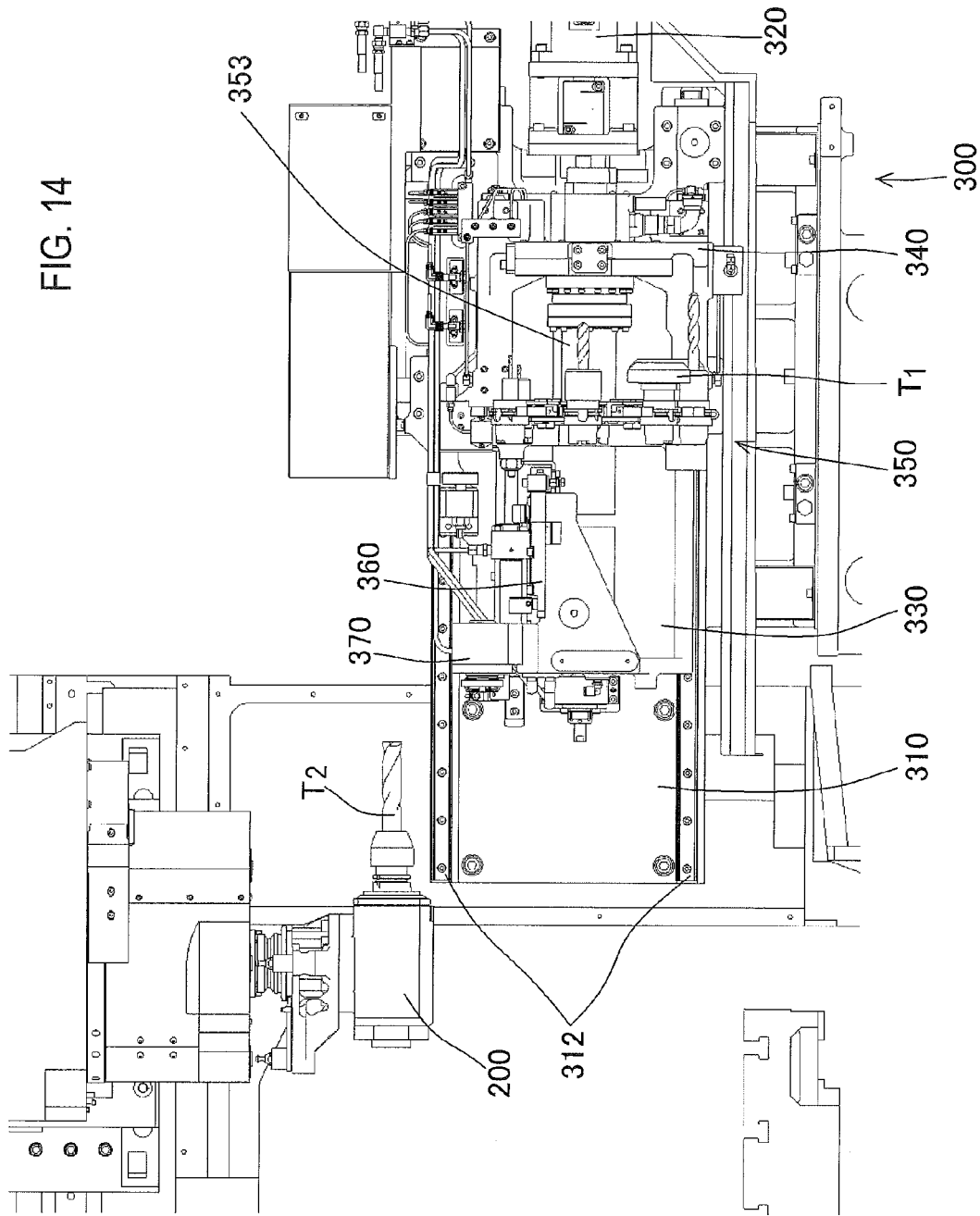

VERTICAL MACHINING CENTER

CROSS-REFERENCE TO RELATED APPLICATIONS

The present application is a continuation application of International Application No. PCT/JP2013/060315, filed Apr. 4, 2013. The contents of this application are incorporated herein by reference in their entirety.

BACKGROUND OF THE INVENTION

Field of the Invention

The present invention relates to a vertical machining center.

Discussion of the Background

When a vertical machining center is used to machine a workpiece on its top surface and side surfaces, which is what is called five-face machining, all steps of the machining are performed on the single vertical machining center by utilizing an angle attachment or an angle tool holder to change an axis orientation of a tool at right angles. The top surface of the workpiece is machined using a normal tool oriented downward. The side surfaces of the workpiece are subjected to what is called angle machining using a tool oriented horizontally by a mechanism to change the axis orientation of the tool spindle. Thus, all the steps of the machining of the workpiece are performed on the single vertical machining center.

Here, the angle attachment is a unit designed exclusively for a relatively large-sized machine. The angle attachment in general has a function to automatically change a tool to be attached to the attachment, and a function to turn and position the attachment on a horizontal plane so as to change the orientation of the tool attached to the attachment. As a result, the unit itself is enlarged and rarely applied to a small-sized machine.

In contrast, the angle tool holder serves for a small-sized machine. The angle tool holder is a tool holder including a spindle perpendicular to the axis of a tool spindle to which the tool holder is attached. In a mechanism to automatically change a normal tool, the angle tool holder is designed to be automatically changeable with respect to the tool spindle in the same manner as that of the normal tool. Some angle tool holders have such a function that, after each angle tool holder is held by the tool spindle, the orientation of the tool of the angle tool holder on a horizontal plane is changed to implement machining of a plurality of side surfaces.

In Japanese Patent No. 4565199 and Japanese Patent No. 4542626, the Applicant has disclosed an angle tool holder clamping unit for an angle tool holder and an angle tool holder mountable in a vertical machining center.

SUMMARY OF THE INVENTION

According to one aspect of the present invention, a vertical machining center includes a table, a tool spindle, an angle tool holder, a tool unclamping operation device, and a tool changer. The tool spindle is provided to be relatively movable with respect to the table in a first direction, a second direction, and a third direction. The angle tool holder is attachable to and detachable from the tool spindle. The angle tool holder includes a shank, a spindle, a housing, a collet, a draw bar, and a spring mechanism. The shank is to be inserted into the tool spindle. The shank has a shank axis and is rotatable around the shank axis. The spindle has a spindle axis perpendicular to the shank axis and is rotatable around the spindle axis. The housing rotatably supports the shank and the spindle and includes an internal transmission mechanism to transmit drive force from the shank to the spindle. The collet is disposed on the spindle to clamp a tool. The draw bar is disposed in the spindle to move forward and backward along the spindle axis to clamp and unclamp the collet. The spring mechanism is to press the draw bar along the spindle axis so that the collet clamps the tool. The tool unclamping operation device is to unclamp the tool. The tool unclamping operation device includes an angle tool holder rest, a hydraulic piston, and a restrictor. The angle tool holder is to be placed on the angle tool holder rest. The hydraulic piston is to press the draw bar of the angle tool holder along the spindle axis. The restrictor is disposed on the angle tool holder rest to restrict a portion of the angle tool holder and to receive force in a direction of the spindle axis which is generated in a case where the hydraulic piston presses the draw bar. The restrictor is provided so that a point of application of the force that the restrictor receives is positioned on a plane which is parallel to the shank axis and contains the spindle axis. The tool changer is to change the tool attached to the angle tool holder with the tool unclamping operation device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 14 is a diagram illustrating an operation of automatic tool change of the angle tool holder;

DESCRIPTION OF THE EMBODIMENTS

Figure 1:
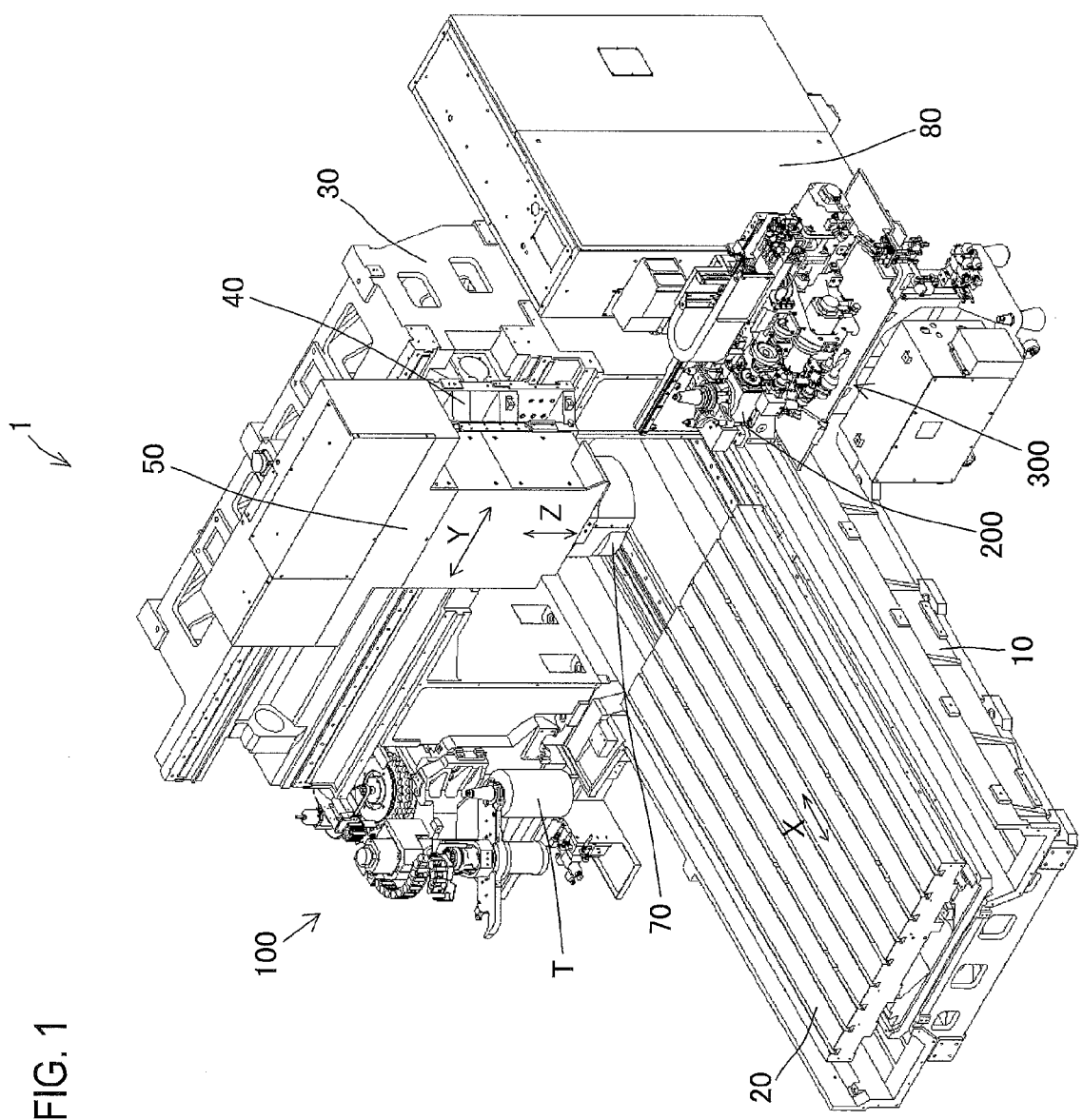
FIG. 1 is a perspective view of an entire vertical machining center according to an embodiment of the present invention.

The embodiments will now be described with reference to the accompanying drawings, wherein like reference numerals designate corresponding or identical elements throughout the various drawings.

FIG. 1 is a perspective view of a vertical machining center provided with a tool changer for an angle tool holder according to an embodiment of the present invention.

The vertical machining center 1 includes a table 20 to move in an X axis direction (X axis direction is referred to as a "first direction") on a bed 10.

A portal column 30 is disposed upright on the bed 10. A saddle 40 is supported on guide rails disposed on a front surface of the column 30, and moves in a Y axis direction (Y axis direction is referred to as a "second direction").

On a front surface of the saddle 40, a spindle head 50 is disposed to be movable in a Z axis direction (Z axis direction is referred to as a "third direction"). A tool spindle 70 is disposed on a lower end portion of the spindle head 50.

A controller 80 is disposed on one side of the bed 10, and provided with a control panel (not shown) for an operator.

On the other side of the bed 10, an automatic tool changer 100 for the tool spindle is disposed to automatically change a tool T with respect to the tool spindle 70.

In the vertical machining center 1 according to the embodiment of the present invention, an angle tool holder storage unit 300 is disposed on the side of the bed 10 where the controller 80 is disposed.

The angle tool holder storage unit 300 stores the angle tool holder 200, which is attachable and detachable with respect to the tool spindle 70, and has a function for automatically changing the tool to be attached to the angle tool holder 200.

Figure 2:
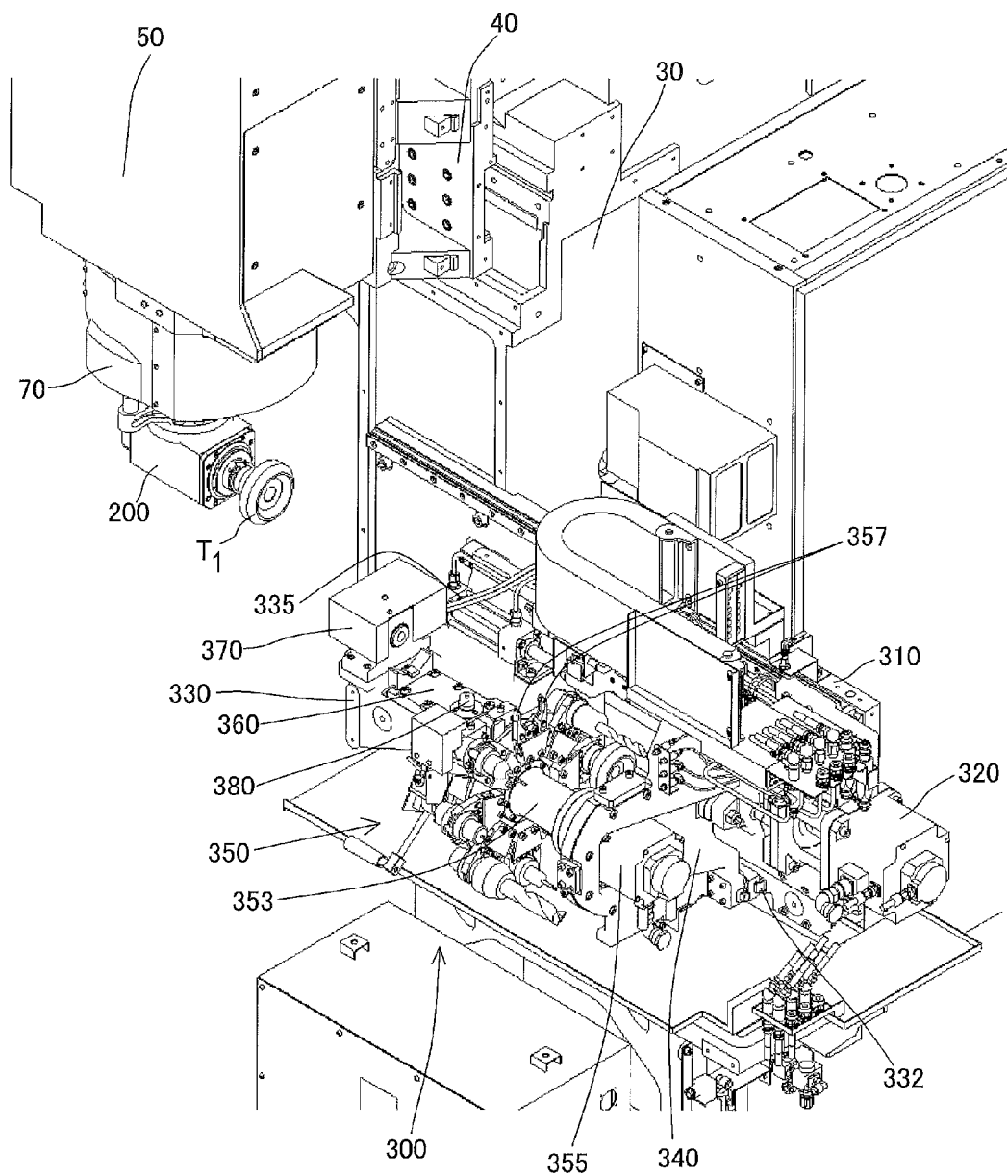
FIG. 2 is a perspective view of essential parts of the vertical machining center according to the embodiment of the present invention.
Figure 3:
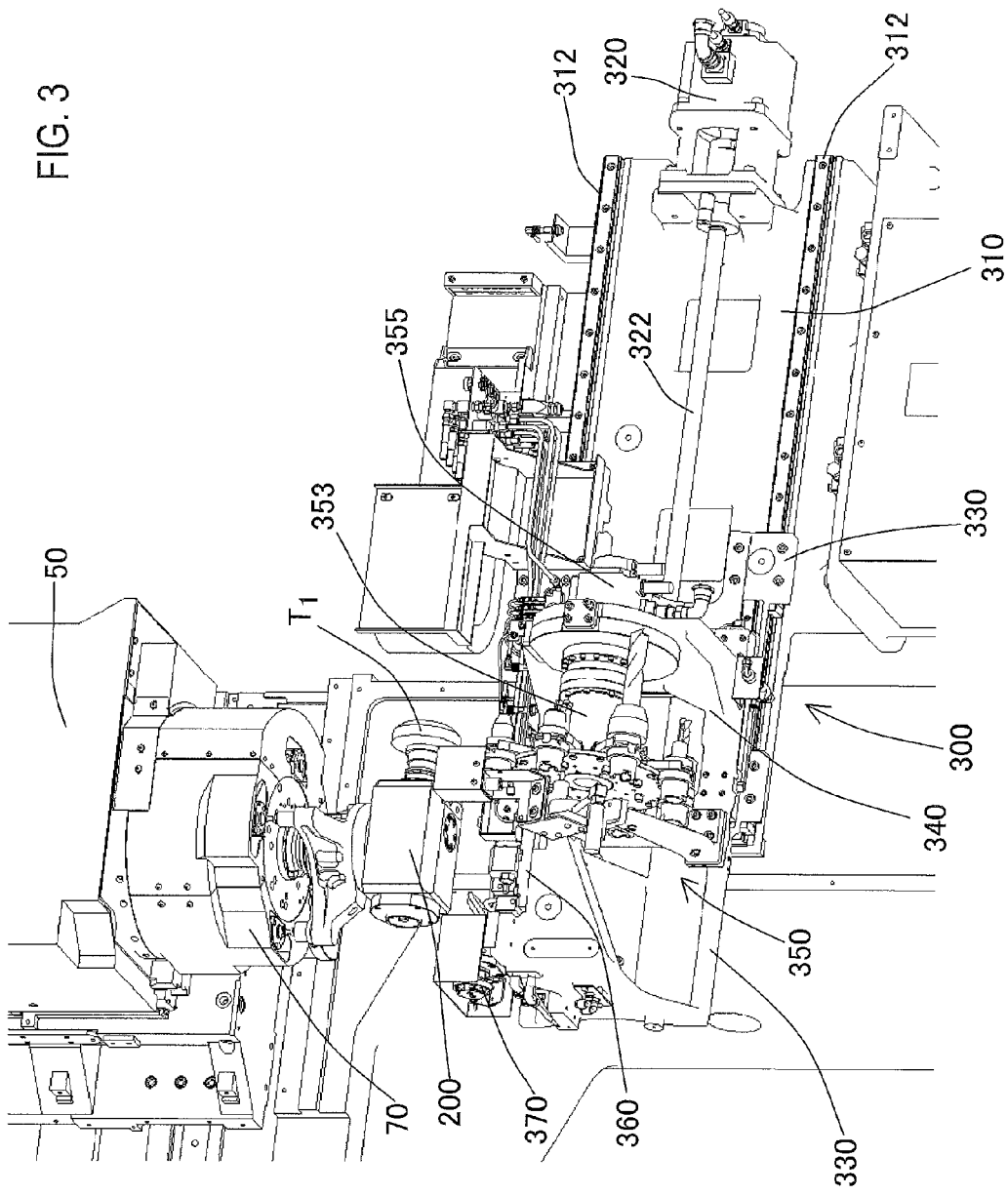
FIG. 3 is a perspective view of the essential parts of the vertical machining center according to the embodiment of the present invention.
Figure 4:
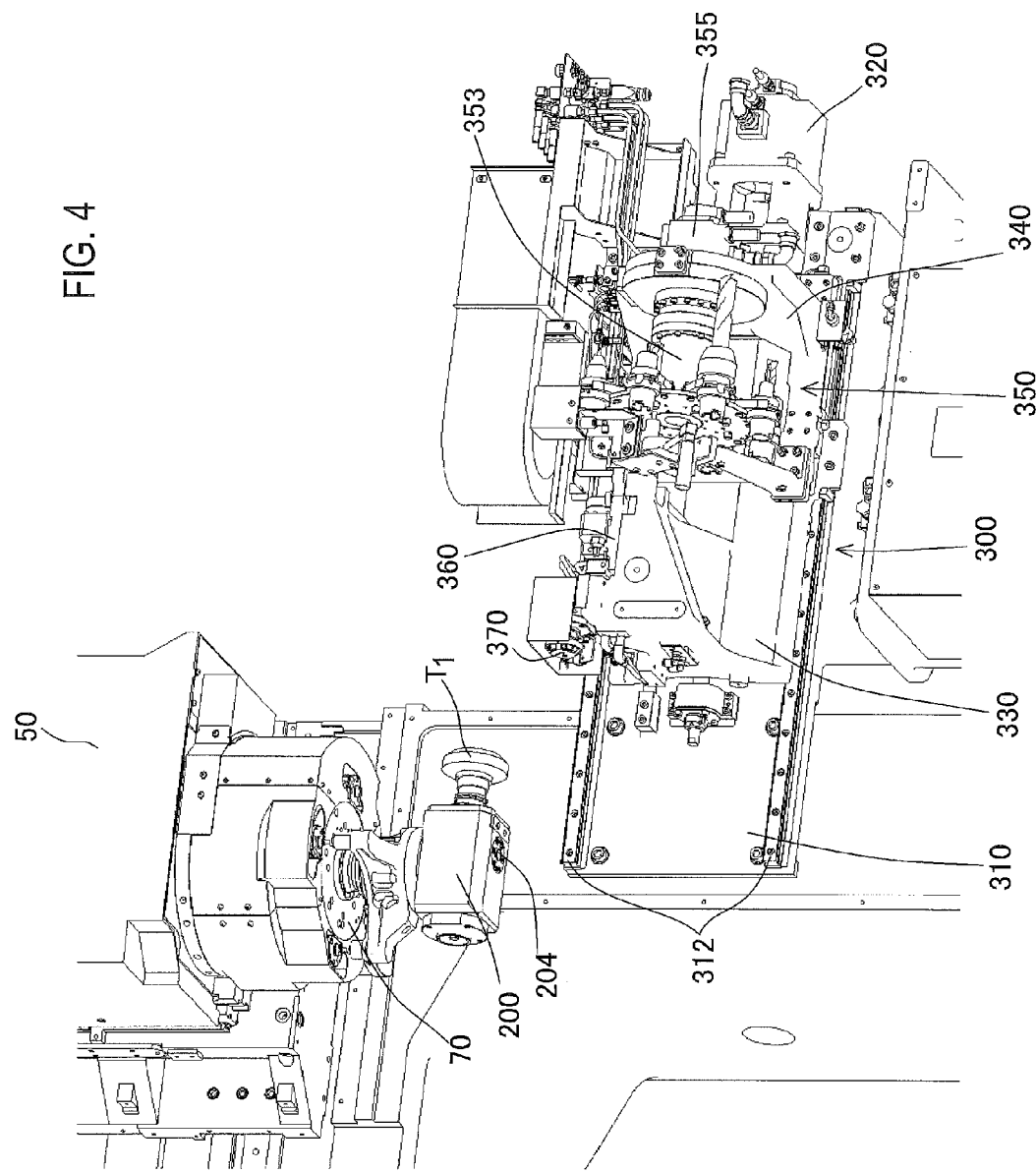
FIG. 4 is a perspective view of the essential parts of the vertical machining center according to the embodiment of the present invention.

FIGS. 2 to 4 are perspective views of a main configuration of the angle tool holder storage unit 300.

The angle tool holder storage unit 300 includes a base 310 and is disposed on the column 30 in such a manner that the base 310 extends outward from the vertical machining center. A servomotor 320 is disposed on an end portion of the base 310. The servomotor 320 drives a ball screw 322 to slide a storage unit main body bracket 330 supported on linear guides 312 so as to position the storage unit main body bracket at a tool change position and a retracting position. The tool change position is a position to which the storage unit main body bracket 330 is moved forward to make an angle tool holder rest 360, described later, enter the vertical machining center. The retracting position is a position to which the storage unit main body bracket 330 is moved backward to retract the angle tool holder storage unit 300 out of the vertical machining center. Thus, at the time of machining, the angle tool holder storage unit is retracted out of the vertical machining center, while at the time of tool change, the angle tool holder storage unit enters a stroke range of the tool spindle in the vertical machining center so as to perform the tool change. That is, merely mounting the angle tool holder storage unit 300 to the column, instead of extending a Y axis stroke of the tool spindle 70, ensures automatic change of a tool to be attached to the angle tool holder. This ensures flexible accommodation to meet customers' needs.

A drum magazine attachment bracket 340 is disposed on the storage unit main body bracket 330 through linear guides 332 in such a manner that, using a cylinder 335, the drum magazine attachment bracket 340 is reciprocative in the same direction as the direction of movement of the storage unit main body bracket 330 to be positioned at a tool attachment/detachment position and a drum magazine turning position. The tool attachment/detachment position is a forward movement end of the drum magazine attachment bracket 340, and the drum magazine turning position is a backward movement end of the drum magazine attachment bracket 340. Note that the directions of the forward and backward movements of the drum magazine attachment bracket 340 are approximately the same as the directions of the forward and backward movements of the storage unit main body bracket 330.

A rotary drum magazine 353 and a drum magazine drive motor 355 are disposed on the drum magazine attachment bracket 340. The rotary drum magazine 353 includes grippers 357 to grip angle machining tools for replacement. The cylinder 335, the drum magazine attachment bracket 340, the rotary drum magazine 353, and the drum magazine drive motor 355 constitute the automatic tool changer 350 for the angle tool holder.

The automatic tool changer 350 for the angle tool holder according to the embodiment of the present invention stores eight angle machining tools.

The angle tool holder rest 360 and an unclamping unit 370 are disposed side by side on the storage unit main body bracket 330. An angle tool holder positioning pin 380 is disposed on the angle tool holder rest 360.

After the angle tool holder 200 attached to the tool spindle 70 is positioned on the angle tool holder rest 360, the tool attached to the angle tool holder 200 is changed. At this time, the tool spindle may unclamp and place the angle tool holder 200 on the angle tool holder rest 360, and the angle tool holder 200 may be stored in the angle tool holder storage unit 300.

The angle tool holder positioning pin 380 has such a function that in changing the tool of the angle tool holder 200, the angle tool holder positioning pin 380 is fitted in a hole 204 in a bottom portion of the angle tool holder 200 to restrict the angle tool holder 200 and receive thrust force of the unclamping unit 370. Here, the hole 204 serves as an engagement device, and the angle tool holder positioning pin 380 serves as a restrictor. A small-sized and light-weight angle tool holder may have less rigidity, however, with this configuration, the angle tool holder is not deformed even when the angle tool holder receives external force impressed to unclamp the tool. This configuration ensures reliable unclamping operation. Also, this configuration prevents excessive force from being exerted on bearings, which are significant component parts for the angle tool holder and the tool spindle having tapered portions to grip the angle tool holder. This, as a result, prevents damage and shortened service life of the bearings.

Figure 5:
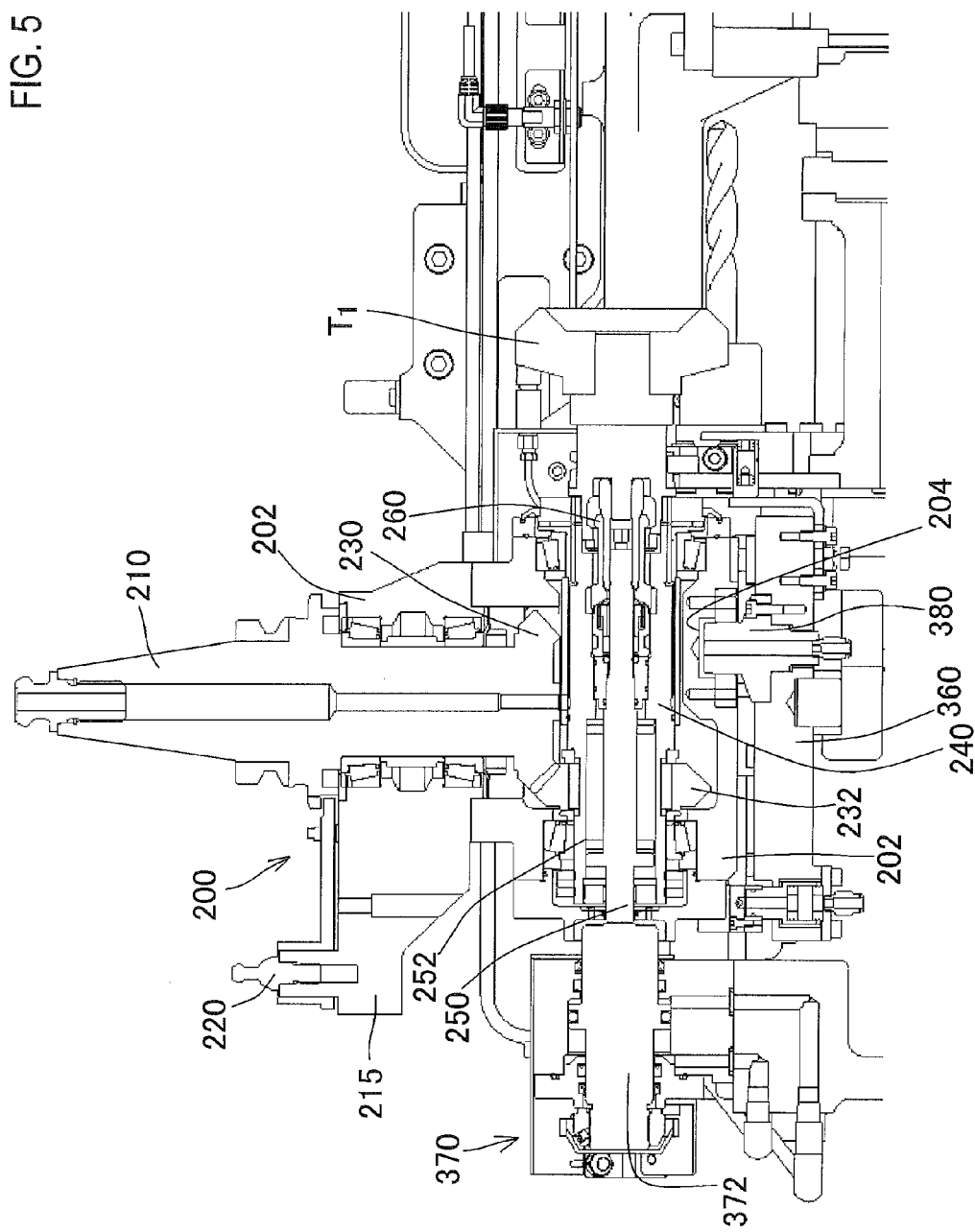
FIG. 5 is a cross-sectional view of an angle tool holder and an automatic tool changer.

FIG. 5 is a cross-sectional view of a configuration of the angle tool holder 200, the angle tool holder rest 360, and the unclamping unit 370.

The angle tool holder 200 includes a shank 210 rotatably supported in a housing 202. The shank 210 is gripped and driven by the tool spindle 70. Three arms 215 extend from the housing 202 in three directions orthogonal to each other except in a direction where the tool is attached to the angle tool holder. Pull stud bolts 220 are respectively disposed on upper end portions of the arms 215 and held by the spindle head 50 so as to sustain cutting reaction force at the time of angle machining. Note that the number of the arms may be one in accordance with required cutting force. The arms and the pull stud bolts, which are provided for sustaining the cutting reaction force in the machining, sustain external force that unclamps an angle machining tool $T_1$, thus contributing to the automatic tool change for the angle tool holder.

A bevel gear 230 is disposed on a lower end of the shank 210, and a bevel gear 232, which meshes with the bevel gear 230, drives a spindle 240 disposed perpendicular to the shank 210.

A draw bar 250 is disposed in the spindle 240.

The angle machining tool $T_1$ is mounted on a front end of the spindle 240 and gripped by a collet 260.

A coned disc spring 252 constantly biases the draw bar 250 in such a direction that the collet 260 clamps the tool $T_1$, namely, in a direction toward a rear end of the spindle 240.

The unclamping unit 370 includes a hydraulic piston 372. Using a front end of the hydraulic piston 372, the unclamping unit 370 presses the draw bar 250 against biasing force of the coned disc spring 252 so as to move the draw bar 250 forward to open the collet 260 and unclamp the tool $T_1$. The unclamping unit 370 and the angle tool holder positioning pin 380 constitute a tool unclamping operation device.

Figure 6:
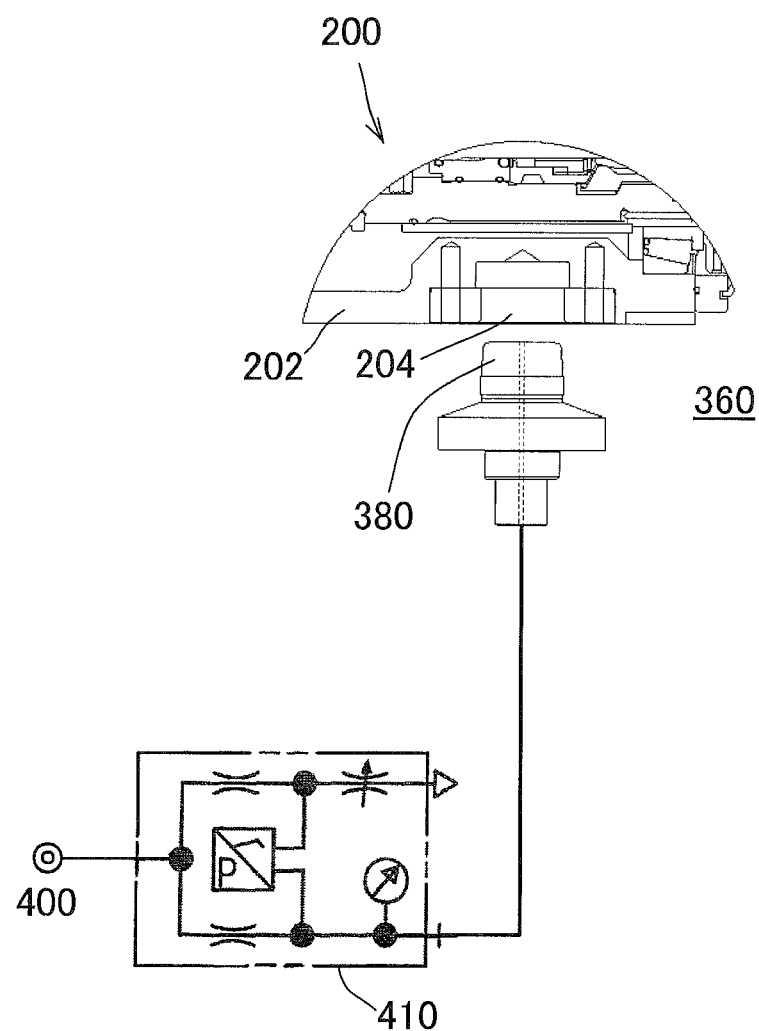
FIG. 6 is a diagram illustrating a device to confirm whether the angle tool holder is seated.

FIG. 6 illustrates a relationship between the hole 204 in the bottom portion of the housing 202 of the angle tool holder and the angle tool holder positioning pin 380 to be inserted in this hole 204.

Both the hole 204 and the angle tool holder positioning pin 380 have circular horizontal sections, and have the centers disposed on a vertical plane within which the axis of the spindle 240 is contained. Thus, even when the angle tool holder receives external force exerted on the draw bar 250 to unclamp the angle machining tool $T_1$, a component of force to rotate the angle tool holder is not generated, which ensures stable operation.

The angle tool holder positioning pin 380 includes an air passage in the center to communicate with the outside through an upper portion of the pin. When the positioning pin 380 is fitted in the hole 204, the path of the air supplied from an air supplier 400 becomes extremely narrow and consequently increases back pressure of the air. This is detected using an air gap sensor 410 to confirm that the angle tool holder 200 is reliably seated on the angle tool holder rest 360. This confirmation prevents a situation in which, when the angle tool holder is not seated in a desirable manner, external force for unclamping is exerted on the draw bar, and then the angle tool holder having low rigidity is damaged.

FIGS. 7 to 14 illustrate steps of automatic tool change of the angle tool holder in the angle tool holder storage unit 300.

Figure 7:
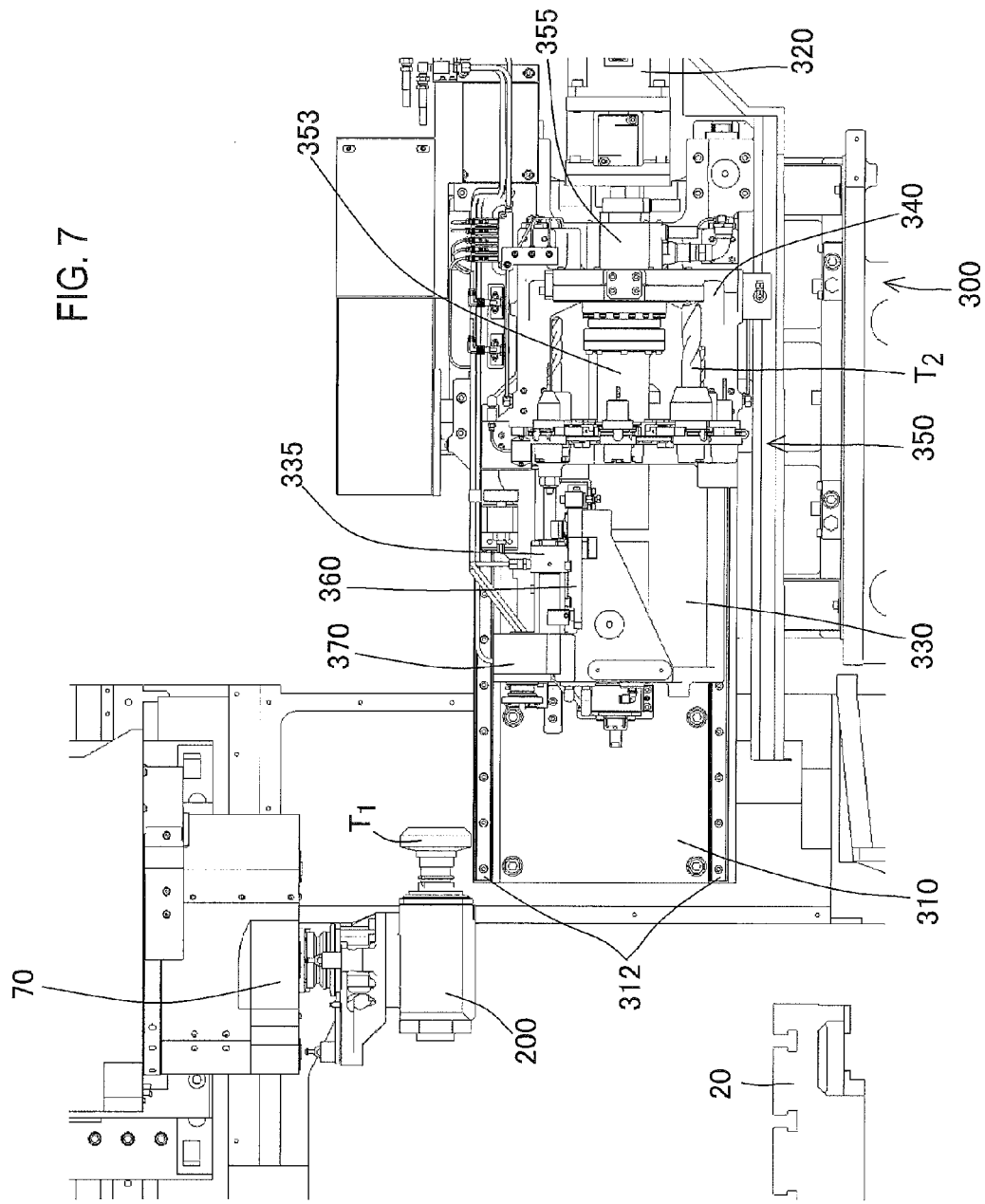
FIG. 7 is a diagram illustrating an operation of automatic tool change of the angle tool holder.

FIG. 7 illustrates a preparatory step of changing the tool $T_1$, which is held by the angle tool holder 200 and has done the angle machining, with a next tool $T_2$ stored in the automatic tool changer 350 for the angle tool holder of the angle tool holder storage unit 300. Specifically, the angle tool holder 200, which has done the angle machining with using the tool $T_1$, is in a state in which the tool is oriented at a predetermined angle in a horizontal plane, and the tool spindle 70 is positioned at a predetermined position on the Y axis and the Z axis. The angle tool holder storage unit 300 is in a standby state. That is, the storage unit main body bracket 330 is positioned at the retracting position, while the drum magazine attachment bracket 340 is positioned at the drum magazine turning position.

Figure 8:
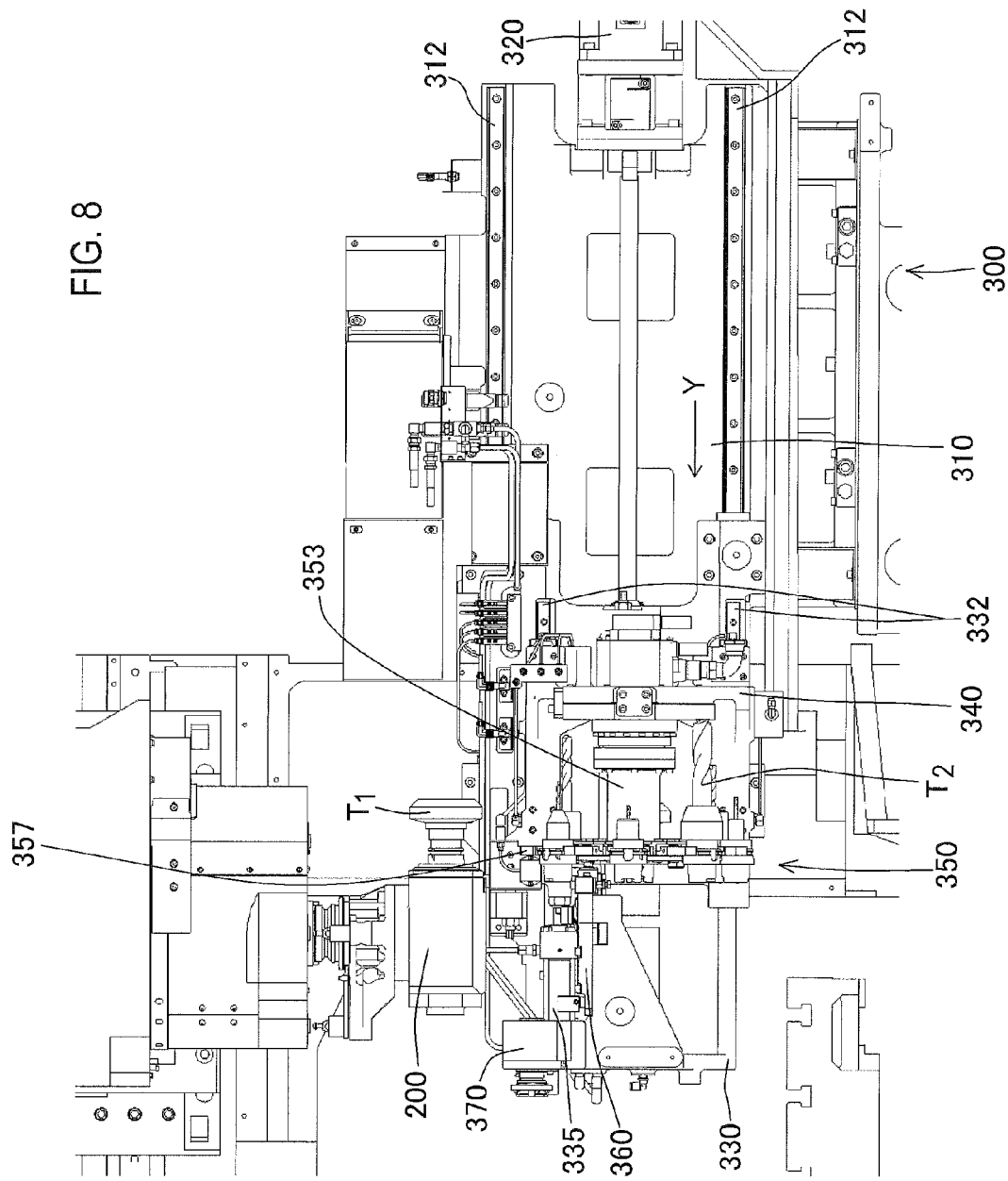
FIG. 8 is a diagram illustrating an operation of automatic tool change of the angle tool holder.

FIG. 8 illustrates a state in which, when the servomotor 320 is operated, the storage unit main body bracket 330 on which the automatic tool changer 350 for the angle tool holder is mounted is moved in the Y axis direction and positioned at the tool change position, and when the cylinder 335 is operated at the same time, the drum magazine attachment bracket 340 is positioned at the tool attachment/detachment position.

Figure 9:
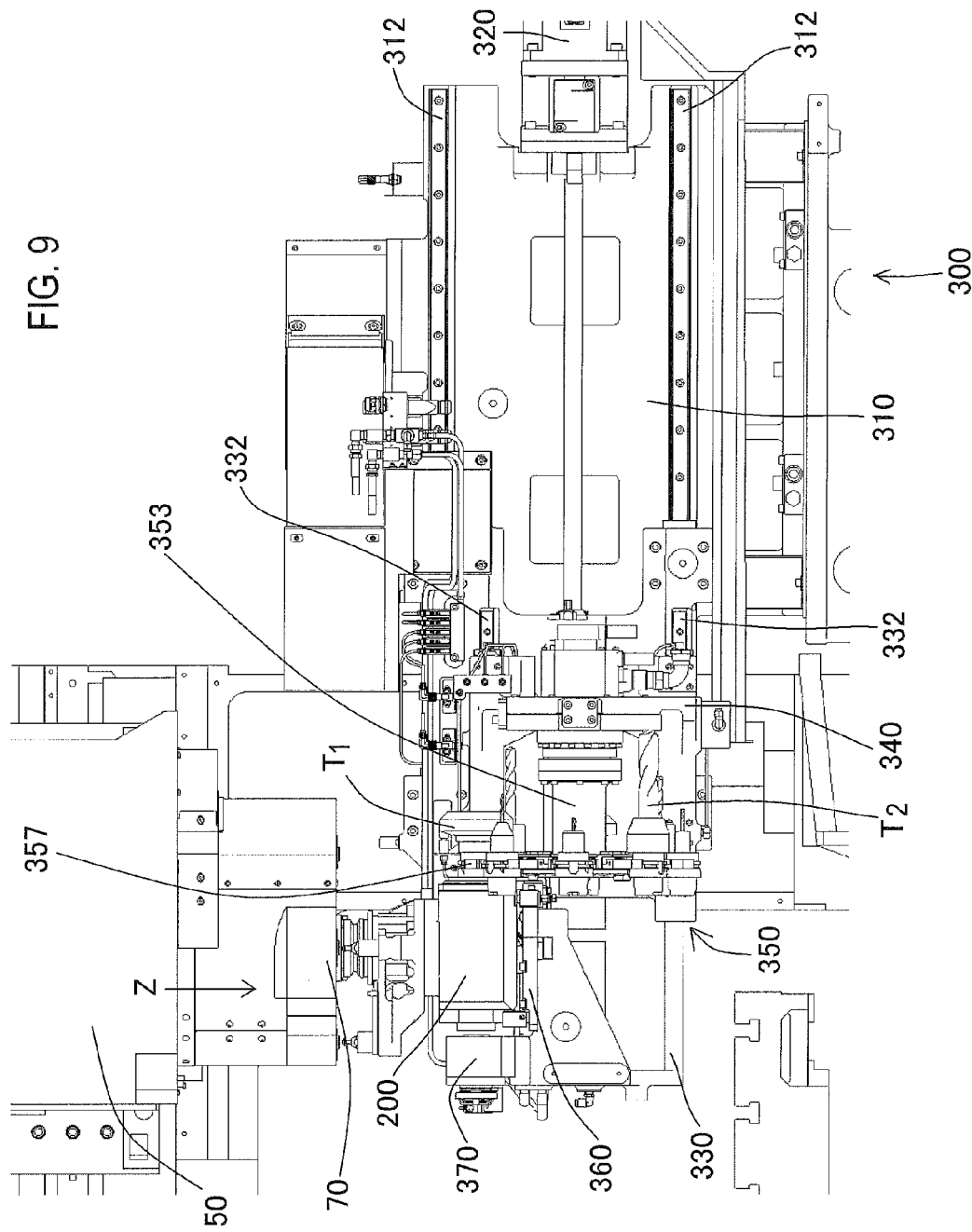
FIG. 9 is a diagram illustrating an operation of automatic tool change of the angle tool holder.

FIG. 9 illustrates a step in which the spindle head 50 is moved downward in the Z axis direction to seat the angle tool holder 200 on the angle tool holder rest 360, and the tool $T_1$ is inserted in the gripper 357 of the rotary drum magazine 353.

As described by referring to FIG. 6, it is detected by the air passage that the angle tool holder 200 is seated on the angle tool holder rest 360, and that the angle tool holder positioning pin 380 disposed on the angle tool holder rest 360 is reliably inserted in the bottomed hole 204 of the angle tool holder 200.

Figure 10:
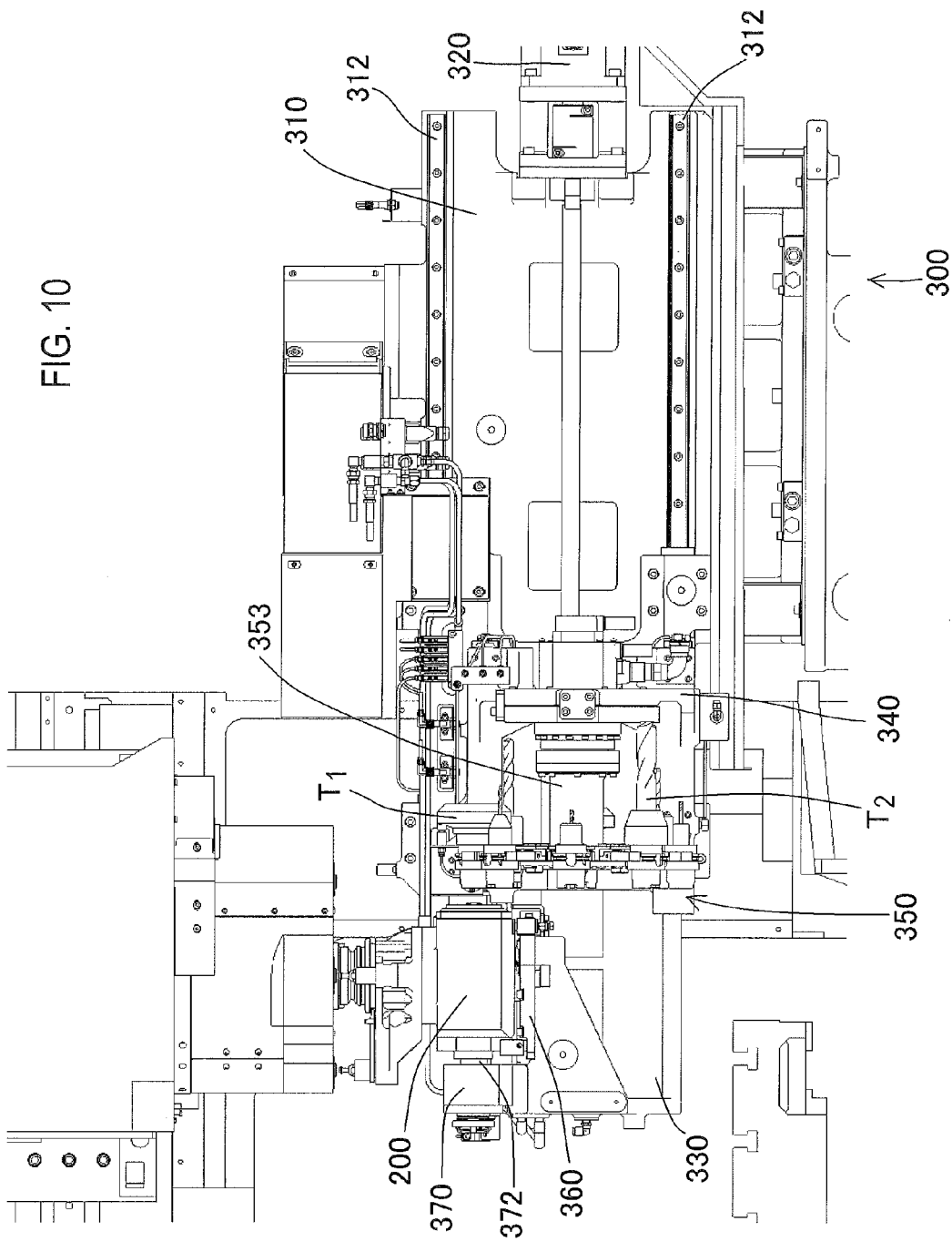
FIG. 10 is a diagram illustrating an operation of automatic tool change of the angle tool holder.

As shown in FIG. 10, after the hydraulic piston 372 of the unclamping unit 370 described by referring to FIG. 5 is operated to project the draw bar 250 to unclamp the angle machining tool $T_1$, the cylinder 335 is then operated to position the drum magazine attachment bracket 340 at the drum magazine turning position, and the rotary drum magazine 353 is retracted from the angle tool holder 200 to wait for the rotary drum magazine 353 to turn.

The angle tool holder positioning pin 380 restricts movement of the angle tool holder 200 in the axial direction of the spindle 240 against projecting force of the piston 372.

Figure 11:
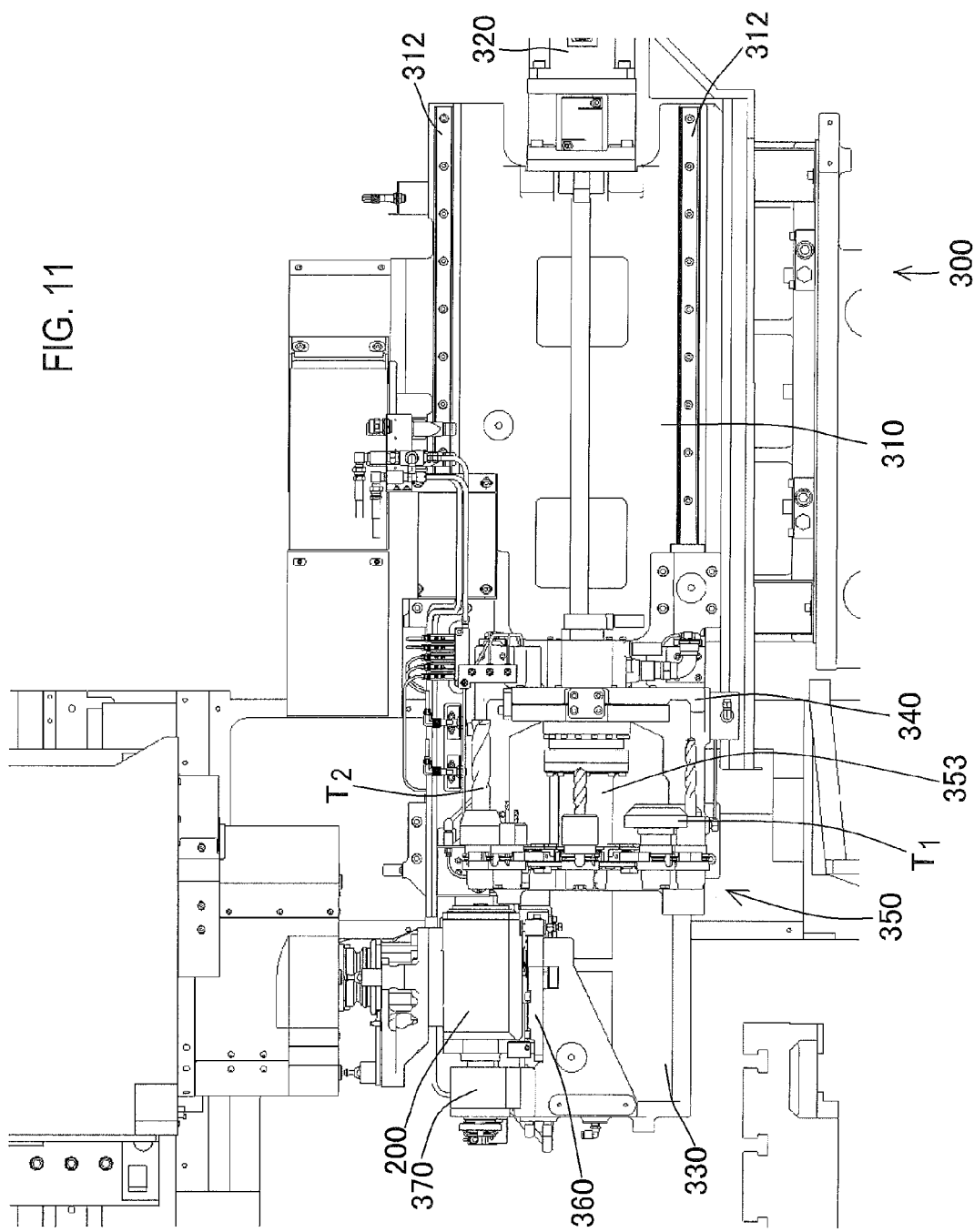
FIG. 11 is a diagram illustrating an operation of automatic tool change of the angle tool holder.

FIG. 11 illustrates a state in which the rotary drum magazine 353 is turned to have the next angle machining tool $T_2$ facing to the angle tool holder 200.

Figure 12:
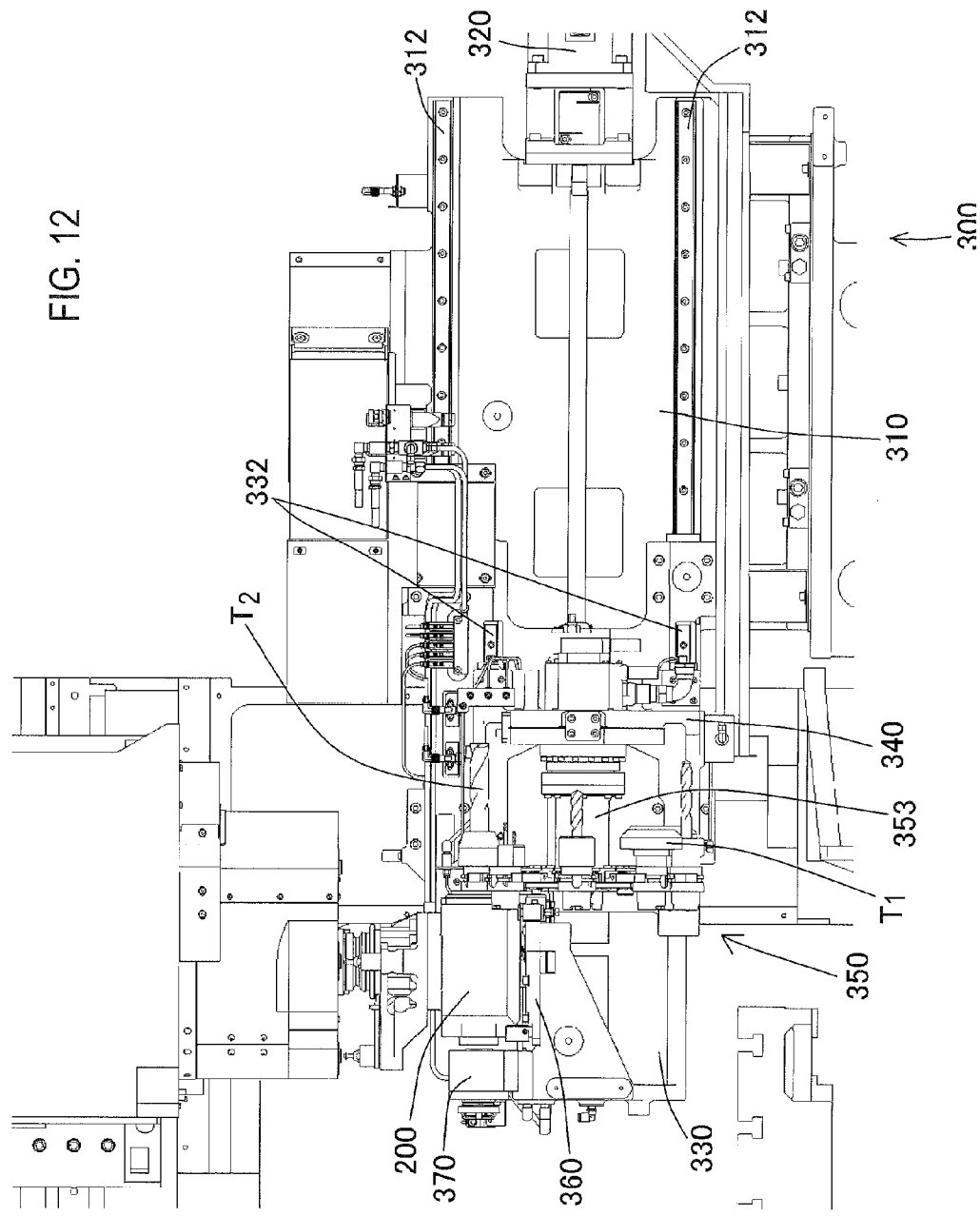
FIG. 12 is a diagram illustrating an operation of automatic tool change of the angle tool holder.

FIG. 12 illustrates a state in which, after the cylinder 335 is operated to move the drum magazine attachment bracket 340 forward to insert the next angle machining tool $T_2$ attached to the rotary drum magazine 353 into the angle tool holder 200, the unclamping unit 370 is operated to retract the piston 372, and the spindle of the angle tool holder 200 grips the next angle machining tool $T_2$.

Figure 13:
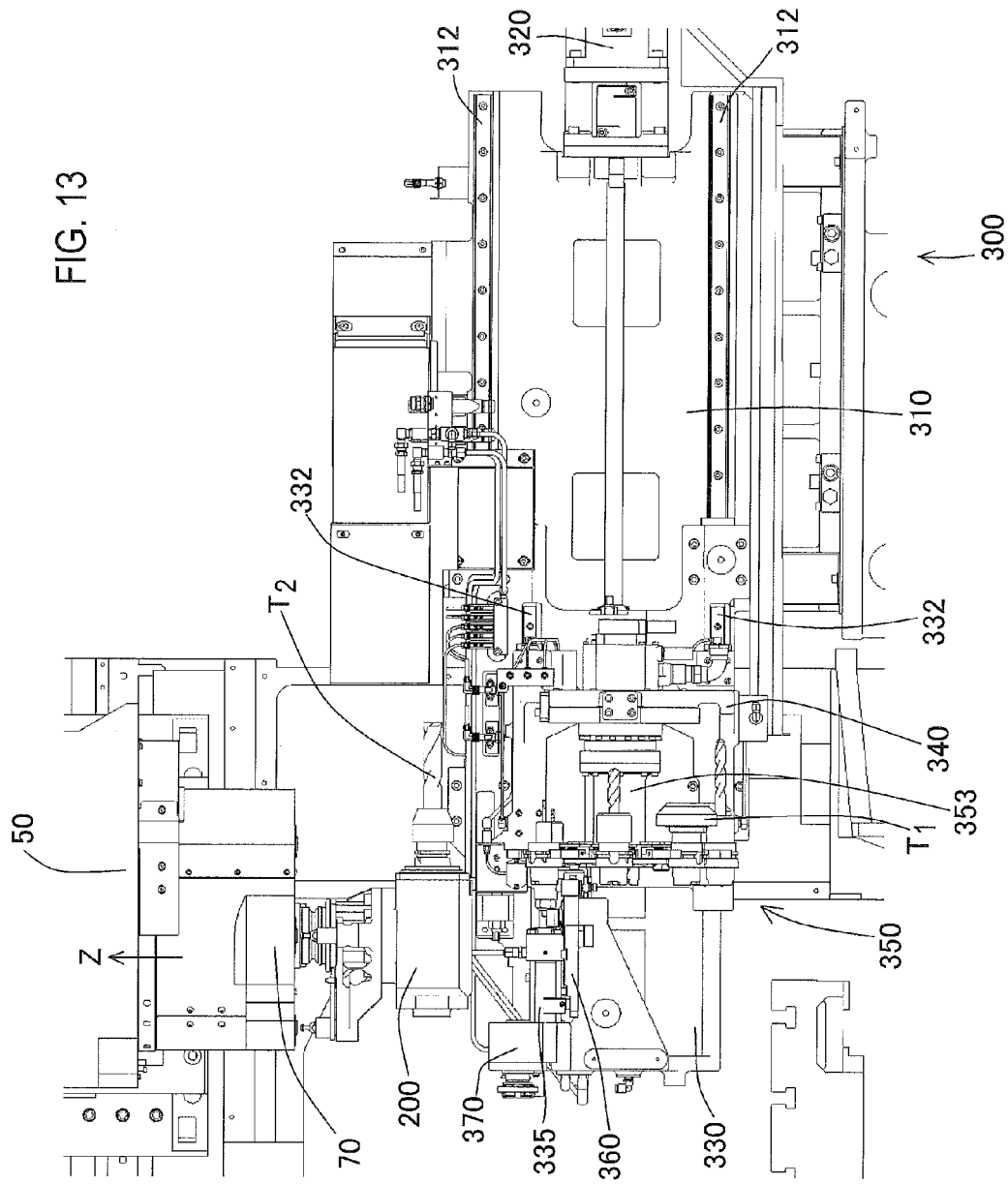
FIG. 13 is a diagram illustrating an operation of automatic tool change of the angle tool holder.

FIG. 13 illustrates a state in which the spindle head 50 is moved upward in the Z axis direction. The angle tool holder 200 holding the new angle machining tool starts machining operation.

FIG. 14 illustrates a state in which the angle tool holder storage unit 300 is returned to the standby state. That is, the storage unit main body bracket 330 is positioned at the retracting position, while the drum magazine attachment bracket 340 is positioned at the drum magazine turning position.

Through the above-described series of steps, the automatic change of the tool of the angle tool holder is completed.

Thus, the angle tool holder storage unit 300 according to the embodiment of the present invention is capable of automatic changing the tool with respect to the angle tool holder 200 while the angle tool holder 200 is mounted on the vertical machining center 1.

Figure 15B:
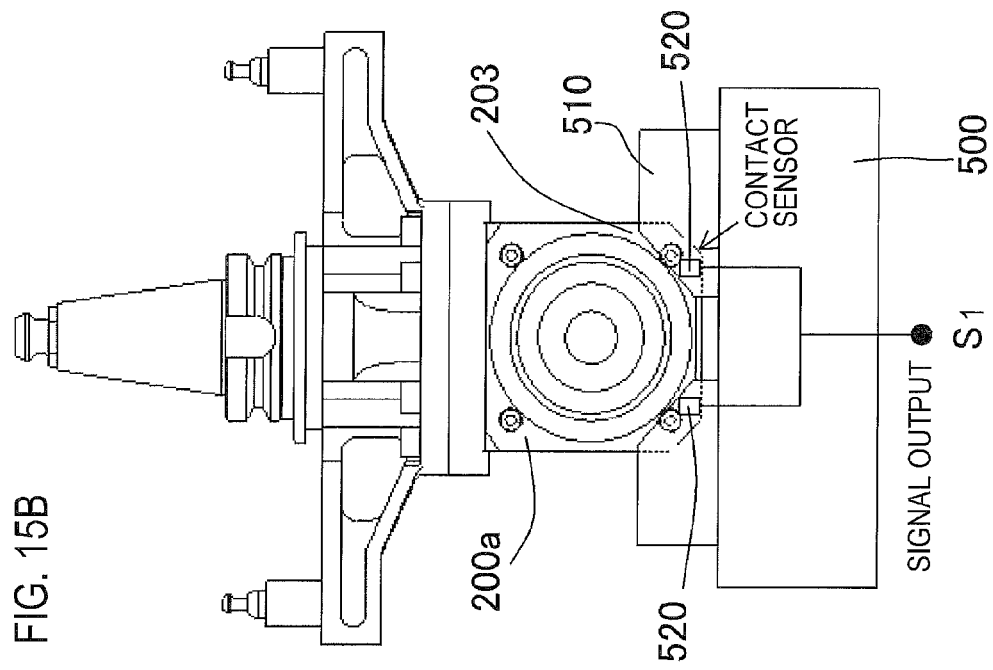
FIGS. 15A and 15B are diagrams illustrating another exemplary restrictor of the angle tool holder.
Figure 15A:
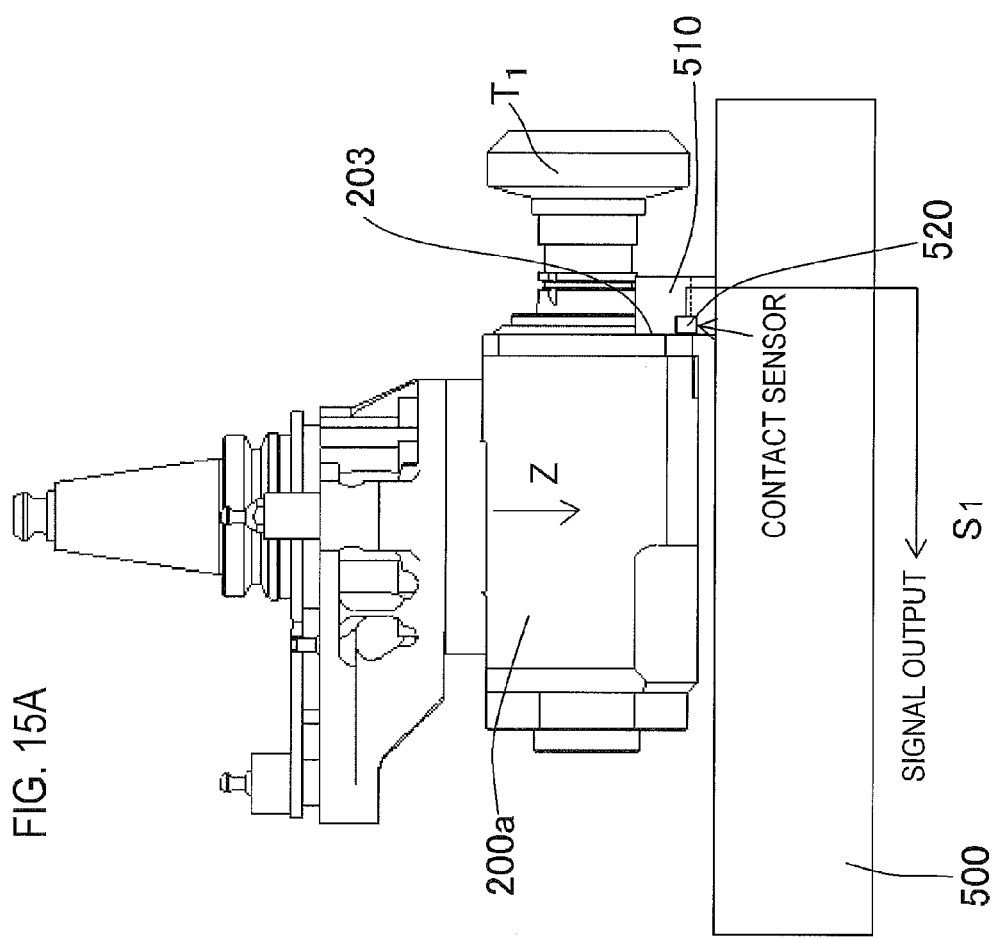

FIGS. 15A and 15B are diagrams illustrating another exemplary restrictor for restricting an angle tool holder to receive force in the axial direction of the spindle at the time of tool change.

In this example, an angle tool holder rest 500 includes a block 510.

At the time of automatic tool change, when the angle tool holder 200a is moved downward in the Z axis direction and positioned on the angle tool holder rest 500, a front end portion 203 of a housing of the angle tool holder 200a is facing to the block 510.

A contact sensor 520 confirms that the angle tool holder 200a is seated, and outputs a signal S1. When the piston of the unclamping unit presses the draw bar in the angle tool holder 200*a*, the block 510 receives this pressing force to achieve unclamping of the angle machining tool T₁. Here, the block 510 serves as the restrictor.

Figure 16B:
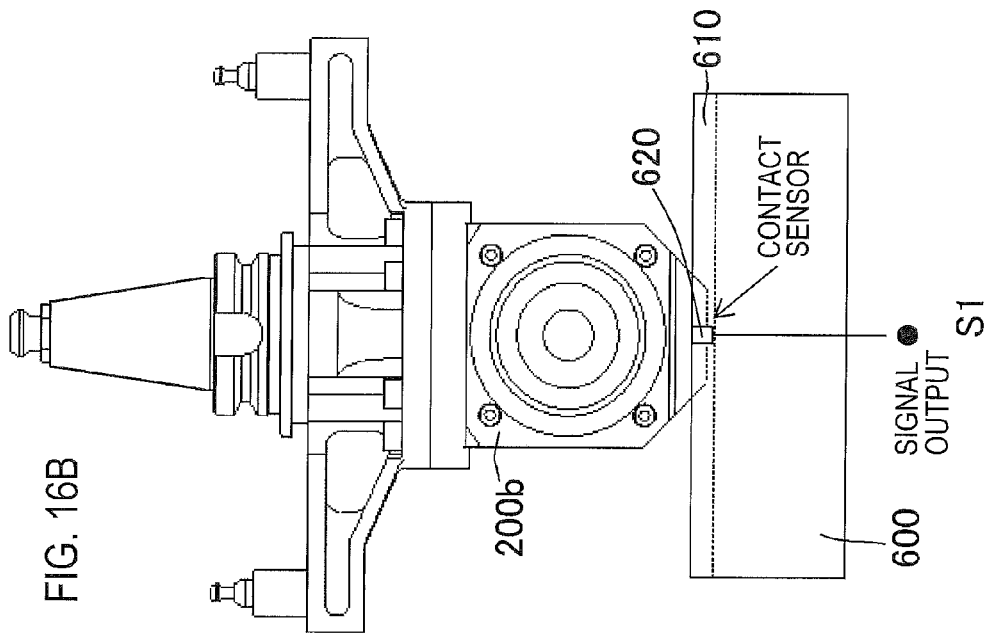
FIGS. 16A and 16B are diagrams illustrating another exemplary restrictor of the angle tool holder.
Figure 16A:
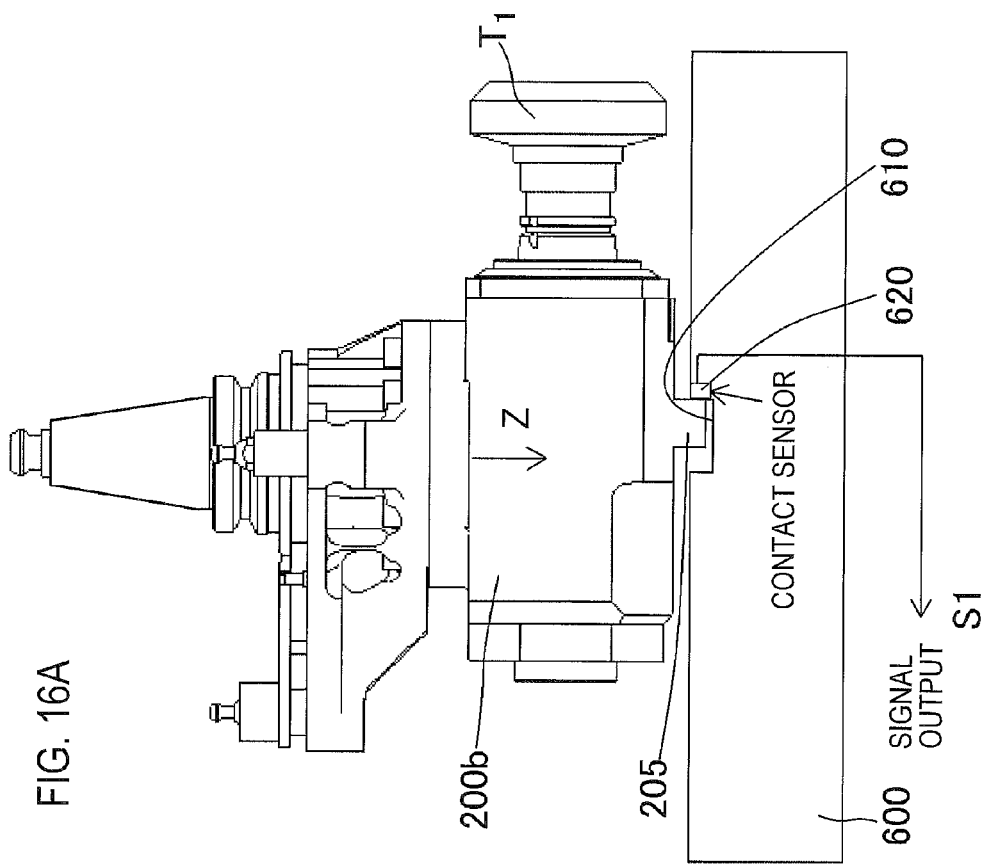

FIGS. 16A and 16B are diagrams illustrating another exemplary restrictor for restricting an angle tool holder to receive force in the axial direction of the spindle at the time of tool change.

In this example, an angle tool holder rest 600 includes a groove 610.

At the time of automatic tool change, when the angle tool holder 200*b* is moved downward in the Z axis direction and positioned on the angle tool holder rest 600, a protruding portion 205 of a housing of the angle tool holder 200*b* enters the groove 610.

A contact sensor 620 confirms that the angle tool holder 200*b* is seated, and outputs a signal S1. When the piston of the unclamping unit presses the draw bar in the angle tool holder 200*b*, the groove 610 receives this pressing force to achieve unclamping of the angle machining tool T₁. Here, the groove 610 serves as the restrictor.

As has been described hereinbefore, the vertical machining center according to the embodiment of the present invention is capable of automatically changing of the tool with respect to the angle tool holder attached to the tool spindle. This ensures optimum machining of a workpiece on the table.

According to one aspect of the embodiment of the present invention, a vertical machining center includes a table and a tool spindle, an angle tool holder, a tool unclamping operation device, and a tool changer. The table and the tool spindle are movable relative to each other in an X axis direction, a Y axis direction, and a Z axis direction. The angle tool holder is attachable and detachable with respect to the tool spindle. The angle tool holder includes a shank, a spindle, a housing, a collet, a draw bar, and a spring mechanism. The shank is to be inserted into the tool spindle. The spindle has an axis perpendicular to an axis of the shank. The housing rotatably supports the shank and the spindle, and includes an internal transmission mechanism configured to transmit drive force of the shank to the spindle. The collet is disposed on the spindle and is configured to clamp a tool. The draw bar is disposed in the spindle to move forward and backward to clamp and unclamp the collet. The spring mechanism is configured to bias the draw bar in a direction in which the collet clamps the tool. The tool unclamping operation device includes an angle tool holder rest, a restrictor, and a hydraulic piston. The restrictor is disposed on the angle tool holder rest, and is configured to restrict a portion of the angle tool holder and to receive force in an axial direction of the spindle. The hydraulic piston is configured to press the draw bar of the angle tool holder such that a point of application of force that the restrictor receives when the hydraulic piston presses the draw bar is one point on a vertical plane within which the axis of the spindle is contained. The tool changer is configured to, with the tool unclamping operation device, change the tool attached to the angle tool holder.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vertical machining center comprising:
   a table;
   a tool spindle provided to be relatively movable with respect to the table in a first direction, a second direction, and a third direction;
   an angle tool holder attachable to and detachable from the tool spindle, the angle tool holder comprising:
      a shank to be inserted into the tool spindle, the shank having a shank axis and being rotatable around the shank axis;
      an attachment spindle having a spindle axis perpendicular to the shank axis and being rotatable around the spindle axis;
      a housing rotatably supporting the shank and the attachment spindle and including an internal transmission mechanism to transmit drive force from the shank to the attachment spindle;
      a collet disposed on the attachment spindle to clamp a tool;
      a draw bar disposed in the attachment spindle to move forward and backward along the spindle axis to clamp and unclamp the collet; and
      a spring mechanism to press the draw bar along the spindle axis so that the collet clamps the tool;
   a tool unclamping operation device to unclamp the tool, the tool unclamping operation device comprising:
      an angle tool holder rest on which the angle tool holder is to be placed;
      a hydraulic piston to press the draw bar of the angle tool holder along the spindle axis; and
      a restrictor disposed on the angle tool holder rest to restrict a portion of the angle tool holder and to receive force in a direction of the spindle axis which is generated in a case where the hydraulic piston presses the draw bar, the restrictor being provided so that a point of application of the force that the restrictor receives is positioned on a plane which is parallel to the shank axis and contains the spindle axis; and
   a tool changer to change the tool attached to the angle tool holder with the tool unclamping operation device.

2. The vertical machining center according to claim 1, wherein the angle tool holder comprises an engagement device on a bottom surface of the angle tool holder, and wherein the tool unclamping operation device comprises the restrictor disposed on the angle tool holder rest to engage with the engagement device.

3. The vertical machining center according to claim 2, wherein the engagement device and the restrictor each have a circular cross-section in a horizontal direction.

4. The vertical machining center according to claim 3, further comprising:
   a determinator to determine whether the restrictor engages with the engagement device, the restrictor having an injection hole through which air is injected into the engagement device at an upper end of the restrictor.

5. The vertical machining center according to claim 4, wherein the tool changer comprises a drum magazine reciprocative in the direction of the spindle axis, and rotatable to be positioned about an axis in parallel with the direction of the spindle axis.

6. The vertical machining center according to claim 5, wherein the tool unclamping operation device and the tool changer are disposed on a column to move between a retracting position and a change position.

7. The vertical machining center according to claim 3, wherein the tool changer comprises a drum magazine reciprocative in the direction of the spindle axis, and rotatable to be positioned about an axis in parallel with the direction of the spindle axis.

8. The vertical machining center according to claim 7, wherein the tool unclamping operation device and the tool changer are disposed on a column to move between a retracting position and a change position.

9. The vertical machining center according to claim 2, further comprising:
a determinator to determine whether the restrictor engages with the engagement device, the restrictor having an injection hole through which air is injected into the engagement device at an upper end of the restrictor.

10. The vertical machining center according to claim 9, wherein the tool changer comprises a drum magazine reciprocative in the direction of the spindle axis, and rotatable to be positioned about an axis in parallel with the direction of the spindle axis.

11. The vertical machining center according to claim 10, wherein the tool unclamping operation device and the tool changer are disposed on a column to move between a retracting position and a change position.

12. The vertical machining center according to claim 2, wherein the tool changer comprises a drum magazine reciprocative in the direction of the spindle axis, and rotatable to be positioned about an axis in parallel with the direction of the spindle axis.

13. The vertical machining center according to claim 12, wherein the tool unclamping operation device and the tool changer are disposed on a column to move between a retracting position and a change position.

14. The vertical machining center according to claim 1, wherein the tool changer comprises a drum magazine reciprocative in the direction of the spindle axis, and rotatable to be positioned about an axis in parallel with the direction of the spindle axis.

15. The vertical machining center according to claim 14, wherein the tool unclamping operation device and the tool changer are disposed on a column to move between a retracting position and a change position.

* * * * *